United States Patent [19]

Mikhailov et al.

[11] 4,300,625
[45] Nov. 17, 1981

[54] PREVENTING DEPOSITION ON THE INNER SURFACES OF HEAT EXCHANGE APPARATUS

[76] Inventors: Gerold M. Mikhailov, prospekt Lenina, 73, kv. 22; Nikolai V. Tyabin, ulitsa Sovetskaya, 39, kv. 5, both of Volgograd; Vladimir A. Khvorostukhin, ulitsa Molodezhnaya, 4, kv. 29, Volzhsky, Volgogradskoi oblasti; Valery V. Zakharov, ulitsa Akademicheskaya, 7, kv. 20, Volgograd; Vitaly N. Nikolaev, prospekt Lenina, 93, kv. 19, Volzhsky, Volgogradskoi oblasti, all of U.S.S.R.

[21] Appl. No.: 734,461

[22] Filed: Oct. 21, 1976

Related U.S. Application Data

[63] Continuation of Ser. No. 542,722, Jan. 21, 1975, abandoned.

[51] Int. Cl.$^3$ ............................................. F28G 1/12
[52] U.S. Cl. ............................... 165/95; 165/104.16; 422/146
[58] Field of Search ................ 23/288 M; 165/104 F

[56] References Cited

U.S. PATENT DOCUMENTS

| | | | |
|---|---|---|---|
| 1,900,857 | 3/1933 | Berry et al. | 23/288 M |
| 2,089,038 | 8/1937 | Pyzel | 23/288 M |
| 2,585,274 | 2/1952 | Reichl | 165/104 F |
| 2,655,437 | 10/1953 | Garbo | 165/104 |
| 2,751,756 | 6/1956 | Hughes et al. | 165/104 F |
| 2,990,161 | 6/1961 | Blaskowski | 165/104 F |
| 3,045,978 | 7/1962 | Wuldhofer | 165/95 |
| 3,055,745 | 9/1962 | Drummond et al. | 23/288 M |
| 3,754,051 | 8/1973 | Sukukawa et al. | 23/288 S |
| 3,822,741 | 7/1974 | Lippitsch | 165/158 |

FOREIGN PATENT DOCUMENTS

| | | | |
|---|---|---|---|
| 1442783 | 1/1969 | Fed. Rep. of Germany | 165/104 F |
| 868368 | 5/1961 | United Kingdom | 165/104 |

*Primary Examiner*—Samuel Scott
*Assistant Examiner*—Theophil W. Streule, Jr.
*Attorney, Agent, or Firm*—Fleit & Jacobson

[57] ABSTRACT

The invention relates to a heat exchanger wherein particle deposition is prevented on the inner surfaces of heat-and-mass transfer and chemical apparatus and comprises introducing into the flow of a liquid medium delivered into the apparatus solid particles which are fluidized by the medium and which exert mechanical action on the surfaces of the apparatus. The solid particles are made of a material neutral toward the medium. Also included in the invention is the provision of an apparatus for carrying out the aforedescribed method.

5 Claims, 8 Drawing Figures

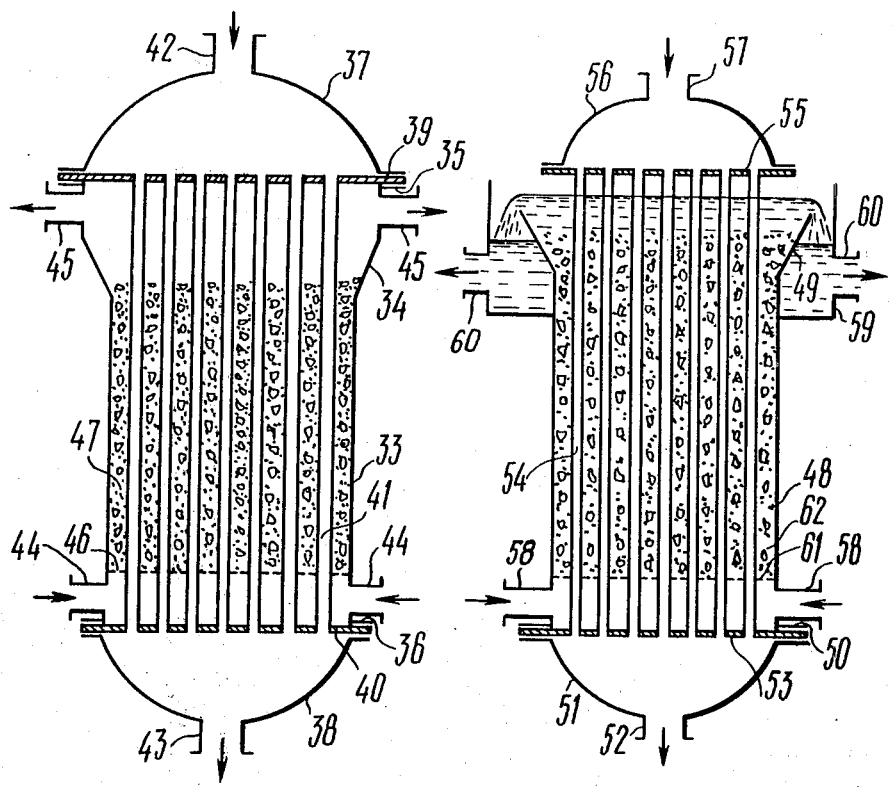

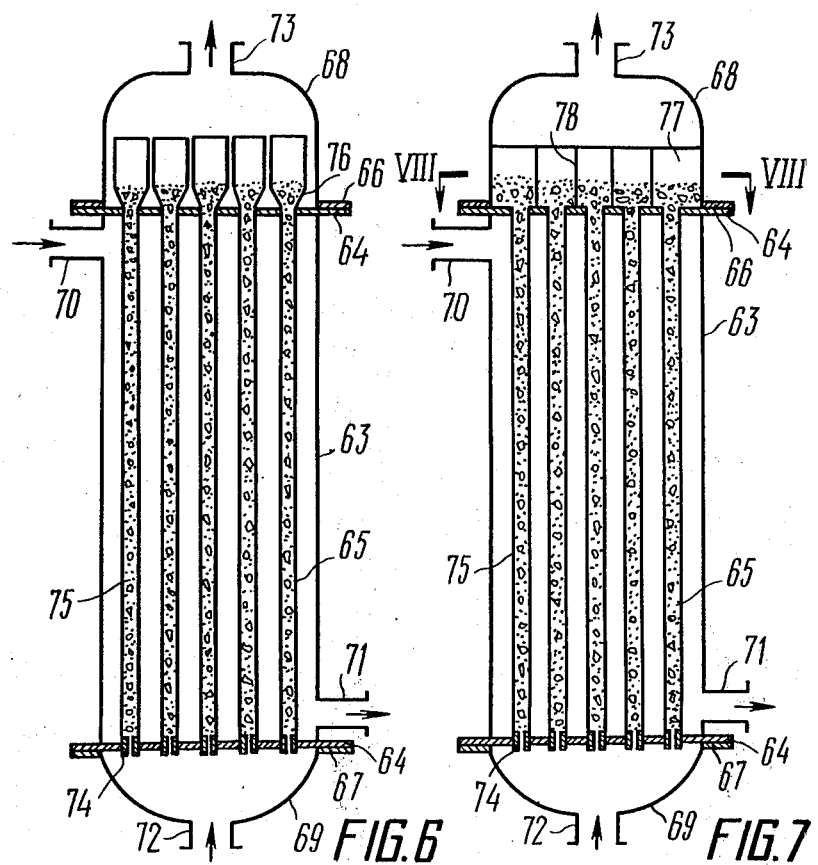

PREVENTING DEPOSITION ON THE INNER SURFACES OF HEAT EXCHANGE APPARATUS

This is a continuation of application Ser. No. 542,722 filed Jan. 21, 1975, now abandoned.

The present invention relates to procedures and apparatus employed in chemical and petrochemical industries, and, more specifically to preventing deposition on the inner surfaces of apparatus and to apparatus utilizing said method.

The present invention can be advantageously employed in chemical, petrochemical, food, power-engineering and other industries where use is made of heat-and-mass transfer units and chemical apparatus.

The most successful use of the invention is, for example, in refrigerators and condensers for preventing deposition from the cooling water; in polymerizers for preventing the polymer from adhering to the walls of the units; or in petroleum heaters for preventing coke deposition on the walls thereof.

It is known in the art to prevent deposition on the inner surfaces of heat-and-mass transfer and chemical apparatus by means of a method whereby solid particles designed for exerting mechanical action on the surfaces of the apparatus are introduced into the liquid medium flow to be supplied into the apparatus.

The inner surfaces of heat-and-mass transfer and chemical apparatus exposed to liquid media gradually accumulate deposits, e.g. boiler scale, muddy or resinous sediments, which impair the efficiency of the apparatus by causing variations in the thermal and hydraulic resistance of their walls.

In accordance with the prior art method, solid particles are introduced into a water cooling apparatus together with the water flow. Upon emerging from the apparatus, the solid particles are separated from the water flow and reintroduced into the apparatus. The solid particles are rubber balls the density of which is close to that of water, owing to which the balls are entirely prevented from being deposited in the apparatus at the points of flow expansion.

The unit utilizing said prior art method comprises a shell-and-tube heat exchanger equipped with ducts for supplying and draining cooling water, the former duct being fitted with a regulating valve. Upstream of the regulating valve the feed line is equipped with the suction branch of a circulation pump. The discharge line of the pump has two branches each equipped with a regulating valve. One of said branches is connected with a rubber ball header, while the other with a device for separating the rubber balls from the water flow. The separator and the header are connected by a pipe with a retaining valve. In addition, the unit is provided with a rubber ball distributor installed in the cooling water feed line and connected with the rubber ball header.

There are two other pipes extending from the rubber ball separator, one of said pipes terminating in a collector mounted in the cooling water discharge line, while the other of said pipes extends right into that same cooling water discharge line downstream of the collector.

Prior to start-up, the valve in the pipe connecting the rubber ball separator with the circulation pump is closed. The water flow created by the pump passes through the header filled with rubber balls, carrying them along. Then the water flow carrying rubber balls passes through the distributor and into the line supplying cooling water into the heat exchanger. While traveling in the tubes of the heat exchanger, the rubber balls exert mechanical action on the inner surfaces thereof, destroying the sediments formed theron. The deposits thus destroyed are carried off by the water flow. Then the rubber balls reach the collector installed in the cooling water discharge line wherefrom together with part of the water flow they are delivered into the separator. The rubber balls are trapped in the separator, whereas the water is drained off via the pipe connecting the separator with the cooling water discharge line.

After the separator has been filled with rubber balls, the valve mounted in the pipe connecting the pump and the separator is opened, whereas the valves mounted in the pipe connecting the pump and the ball header and in the pipe connecting the separator and the cooling water discharge line are closed. The water flow from the circulation pump passes through the separator, entraining the rubber balls and carrying them via the retaining valve into the rubber ball header. Some of the rubber balls are left in the header, whereas the others pass through the distributor and emerge in the cooling water feed line. Then the balls are carried by the main water flow through the heat exchanger and into the collector.

When all the rubber balls from the separator find their way to the header, the valve in the pipe connecting the circulation pump and the separator is closed, whereas the valve in the pipe connecting the pump and the header is reopened. Besides, the valve in the pipe connecting the separator and the cooling water discharge line is also opened. After this the entire cycle of operation is repeated.

The prior art method of preventing deposition on the inner surfaces of apparatus as described hereabove has several disadvantages, such as a very limited choice of materials for the rubber balls. The solid particles must have a density close to that of the working medium. Furthermore, they must be elastic enough lest they be destroyed while passing through the circulation pump. For this reason the prior art method can only be employed for preventing and eliminating relatively unstable muddy deposits.

According to the known method, the rubber balls move in the water flow and are thus able to act only on the surfaces with which the water flow comes into contact. In stagnant zones and where the flow does not contact the surfaces, the latter remain unscoured, which constitutes another disadvantage of the known method.

More serious still, the prior art method of preventing deposition on the inner surfaces of apparatus requires special equipment, which implies additional power requirements and calls for additional floor-space.

There also exist apparatus wherein the inner surfaces are scoured by means of solid particles introduced into the working medium flow. One of such known apparatus is a shell-and-tube unit comprising a housing which accommodates vertically mounted tubes arranged in parallel relationship one with another. The ends of said tubes are fixed in tube walls mounted in the housing and dividing the inner space of the apparatus into a tubular space and an intertubular space, both provided with connecting branches for feeding and discharging the specific medium of each space, and there is a grid installed in the intertubular space of the apparatus somewhat above the level of the branch wherethrough the liquid medium is delivered thereinto, said grid being designed for accommodating a layer of solid particles and for uniformly distributing the liquid medium flow.

The housing of said known apparatus has a constant cross-section along the centre height of the tubes, owing to which, as the flow rate of the liquefying medium rises above the rated one, the solid particles are carried from the intertubular space into the branch for discharging the medium. Besides, in the known apparatus, at the rated flow rate, the fluidized bed of solid particles must lie somewhat below the level of the medium discharge branch, in the vicinity of the branch the flow narrows down, with its velocity rising to the particle-entraining speed. As a result, the upper portions of the tubes and housing are left unscoured, so that deposits build up on such portions as work progresses, thereby reducing the passage section of the intertubular space of the apparatus. In consequence of this phenomenon, the flow velocity in the narrowed portions rises even at the rated flow rate and the solid particles are carried away from the intertubular space.

Another known apparatus using a method of preventing deposition on the inner surfaces thereof is a shell-and-tube-apparatus comprising a housing with a plurality of vertically mounted tubes arranged in parallel relationship one with another, the ends of said tubes being fixed in tube walls mounted in the housing and separating the tubular space from the intertubular space, both these spaces being provided with branches for feeding and discharging their specific media, each of said tubes being partially filled with solid particles, and a device to keep the solid particles inside the tube being installed at the liquid medium inlet of each tube.

The tubes of said known apparatus have a uniform cross-section along the entire length thereof. Owing to different flow velocities in different tubes, particles from some tubes are carried away, while other tubes get clogged therewith. The velocity differential is due to the fact that the tubes generally differ by their hydraulic characteristics which, in addition, vary in the course of operation of the apparatus.

In order to prevent the particles from escaping from the tubes, the medium flow velocity therethrough is reduced to a value at which the particles will stay in the tube having the lowest hydraulic resistance. Hence, in the rest of the tubes having higher values of hydraulic resistance the particles will be out of contact with the surfaces of the upper portions thereof, entailing deposition thereon and variations in the hydraulic resistance values of the tubes, with the result that the flow velocity in the tubes will vary so that particles from some tubes will be carried over into others and finally some tubes will be completely clogged.

It is an object of the present invention to prevent deposition on the inner surface of apparatus such as would be reliable and conducive to a higher rate of the basic process taking place in the apparatus.

It is another object of the invention to provide apparatus for carrying out the method of this invention.

One of the foregoing objects is attained by the provision of a method of preventing deposition on the inner surfaces of heat-and-mass transfer and chemical apparatus, which comprises introducing solid particles for exerting mechanical action on the apparatus surfaces into the liquid medium flow delivered into the apparatus, whereby, in accordance with the invention, the solid particles are fluidized by said liquid medium flow having a velocity below the particle-entraining velocity, and the material from which said particles are made is neutral towards the medium.

The proposed method permits using solid particles made of a variety of materials having different densities chosen depending on the type of deposits to be removed.

Owing to the fluidized state of the particles, the proposed method permits the scouring of curvilinear surfaces having portions lying outside of the medium flow path, including concave surfaces.

The proposed method also is conducive to certain beneficial side effects. Thus, with the medium being vigorously agitated in the fluidized bed, the need for mixing devices is obviated.

While moving about, the solid particles destroy the laminar boundary layer which offers most of the thermal resistance, e.g. in heat exchangers. As a result, heat exchange becomes more active, which permits reducing the heat transfer surface area thus minimizing the size of the apparatus.

In various reactors, the presence of solid particles and their random movements eliminate the temperature gradients which arise due to the variations in the rate of chemical processes through the volume of the apparatus in those cases where such processes are endo- or exothermic.

The other object of the invention is attained by the provision of a shell-and-tube apparatus for carrying out the foregoing-described method, which apparatus comprises a hollow housing accommodating a plurality of vertically mounted tubes arranged in parallel relationship one with another, the ends of said tubes being fixed in tube walls installed in the housing and dividing the inner space of the apparatus into a tubular space and an intertubular space, both said spaces being provided with branches for feeding and discharging the medium specific to each space, and a grid disposed in the intertubular space of the apparatus somewhat above the position of the liquid medium feed branch, said grid serving to carry a bed of solid particles and to uniformly distribute the liquid medium flow, in which, in accordance with the invention, the upper portion of the apparatus has a widening section to prevent the solid particles fluidized by the liquid medium flow from being carried away from the intertubular space.

As deposits on the inner surfaces of the apparatus build up and the intertubular space of the apparatus thereby narrows down, causing a rise in the medium flow velocity, some of the solid particles are carried over into the widening portion of the housing wherein the medium flow carrying, the particles loses some of its velocity and the solid particles are thus retained within the apparatus housing.

As the medium flow velocity decreases to the rated one, the particles forced into the widening portion of the housing return to the intertubular space of the apparatus.

In one of the embodiments of the invention, the widening portion of the apparatus housing is formed as an open overflow lip below which there is a vessel for collecting liquid medium free from solid particles which is attached to the housing, with a branch for draining said medium being connected to said vessel.

Such a structure is employed in those cases where superatmospheric pressure is not required for the operation of the apparatus. The overflow lip provides for regular medium removal from the intertubular space of the apparatus, which permits reducing the overall height of the apparatus housing and, inter alia, the height of that portion thereof which lies in the vicinity of the flow outlet from the intertubular space and is thus inaccessible to the solid particles.

The foregoing object may likewise be attained by the provision of a shell-and-tube apparatus, comprising a housing which accommodates a plurality of vertically mounted tubes arranged in parallel relationship one with another, the ends of said tubes being fixed in tube walls installed in the housing and dividing the inner space of the apparatus into a tubular space and an intertubular space, both said spaces having branches for feeding and discharging the specific medium of each space, and each of said tubes being partially filled with solid particles, with a means for keeping solid particles inside being mounted in each tube at the medium flow inlet, in which, in accordance with the invention, each of said tubes widens at the point of flow outlet, said widening portion serving to prevent the solid particles from being carried away from the tube by the medium flow which fluidizes the solid particles.

Such a structure obviates any possibility of solid particles being carried over from one tube to another should the flow velocity in one of the tubes happen to rise.

In one of the embodiments of the apparatus, each of said widening portions is formed as a diffuser.

In an alternative embodiment of the invention, the widening portion of each tube is a section made up of partitions, each partition adjoining the respective tube wall by way of one edge thereof, said partitions being in parallel relationship with the tubes and serving to separate the tube outlets one from another.

The foregoing structure is employed in cases where the apparatus comprises a comparatively large number of tubes per tube wall unit area.

The invention will be further understood from the following description of specific embodiments thereof taken in conjunction with the accompanying drawings, wherein:

FIG. 4 is an axial elevation of a shell-and-tube heat exchanger;

FIG. 5—ditto, an alternative embodiment;

FIG. 6 is an axial elevation of a shell-and-tube apparatus;

FIG. 7—ditto, an alternative embodiment; and

Figure 8:
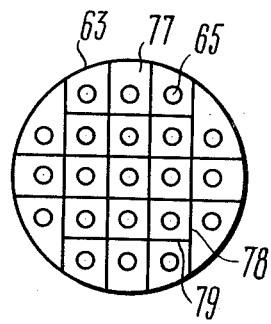

FIG. 8 is a view taken along the line VIII—VIII in FIG. 7.

The present invention is aimed at preventing deposits from various liquid media (scale, muddy or resinous sediments) from building up on the inner surfaces of chemical and heat-and-mass transfer equipment. The method may find application in such apparatus as reactors with liquid reagents, liquid mixers, heat exchangers (refrigerators, heaters or condensers), evaporators, stills and pipeline risers.

Figure 1:
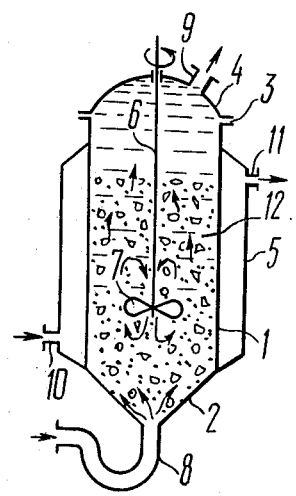
FIG. 1 is a schematic illustration of an axial elevation a mixer.

Referring now to the drawings, FIG. 1 depicts a mixer of liquids serving to produce emulsions. It comprises a hollow cylindrical housing 1 having a conical bottom 2. The upper end (as seen in the drawing) of the housing 1 carries a fixed flange 3 for attaching a cover 4. The housing 1 is provided with a jacket 5 wherethrough cooling water circulates.

There is a hole formed in the centre of the cover 4 which receives a drive shaft 6.

Fitted on the free end of the shaft 6 is an agitator mixer 7. In the centre of the bottom 2 there is provided a hole with a branch 8 for feeding starting components into the apparatus, whereas the product emulsion is discharged via a branch 9 connected to a hole formed in the apparatus cover 4. The apparatus jacket 5 has branches 10 and 11 which serve, respectively, for feeding and discharging cooling water. The housing 1 of the apparatus is partially filled with balls 12 made of a ceramic material inert towards the components being mixed. The diameter of the balls 12 is so selected that the ball-entraining velocity is higher than the velocity of the upward stream in the apparatus corresponding to the maximum permissible flow rate of the components.

The apparatus operates in the following manner.

Cooling water is continuously fed into the jacket 5 of the housing 1 via the branch 10 and drained therefrom via the branch 11. Simultaneously, the shaft 6 with the agitator mixer 7 is driven into rotation and the starting components are fed into the apparatus housing 1 via the branch 8. The product emulsion is discharged via the branch 9. The direction of rotation of the shaft 6 with the mixer 7 is so selected that in the central portion of the apparatus the liquid is driven downwards, whereas in the periphery of the apparatus upwards. So, the liquid in the apparatus executes a compound motion depending on the flow rate of the components delivered into the apparatus, on the one hand, and on the rotation of the mixer 7, on the other. The number of revolutions of the mixer 7 per unit time is so selected as to ensure that the overall velocity of the upward flow in the central portion of the apparatus is sufficient to fluidize, or render quasi-liquid, the balls 12 present in the apparatus. The balls 12 thus fluidized execute a vigorous random motion, continuously exerting mechanical action on the walls of the apparatus and on the mixer 7 and thereby preventing deposition thereon.

In addition, the moving balls 12 continuously destroy the laminar boundary layer on the inner surfaces of the apparatus, considerably promoting heat exchange through the apparatus wall between the components being mixed and the cooling water. Furthermore, the intensive random movements of the balls 12 substantially boost the process of emulsification.

The apparatus shown in FIG. 1 may be equally successfully employed for heating or cooling liquids liable to form deposits, for implementing chemical reactions accompanied by the formation of solid by-products, or for polymerizing or copolymerizing monomers where solid high-molecular polymeric deposits are formed on the walls of the apparatus and on the mixer.

Figure 2:
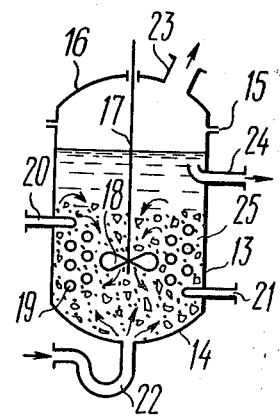
FIG. 2 is an axial elevation of an evaporator.

FIG. 2 illustrates an evaporator for concentrating solutions of solid substances, such as salts, sugar, etc. The apparatus comprises a hollow cylindrical housing 13 with an elliptical bottom 14. A flange 15 for connecting a cover 16 is attached to the upper end (as seen in the figure) of the housing 13. A centre hole is formed in the cover 16 for receiving a drive shaft 17 with an agitator mixer 18 mounted on the free end of the shaft 17. The housing 13 of the apparatus also accommodates a coil 19, the ends thereof, which extend beyond the housing 13, terminating in branches 20 and 21 which serve, respectively, for feeding heating steam into the apparatus and for discharging the condensate therefrom. The bottom 14 of the apparatus has a hole with a branch 22 for feeding the starting solution, whereas the cover 16 is provided with a hole with a branch 23 for discharging the secondary steam which is formed in the evaporation of the solution. An additional hole with a branch 24 is provided in the housing 13 somewhat below the solution level therein, said hole with the branch 24 serving to discharge the concentrated solution.

The apparatus housing 13 is partially filled with balls 25 made of a material inert to the solution being evaporated, e.g. porcelain. The diameter of the balls 25 is so selected that the rate of their sedimentation in the solution is higher than the velocity of the upward flow of the concentrated solution in the apparatus.

The apparatus operates in the following manner.

The apparatus is charged with the starting solution to a prescribed level via the branch 22. Then the mixer 18 is actuated. The direction of rotation of the mixer 18 is so set that it drives the solution downwards in the central portion of the apparatus and upwards in the periphery thereof, and the speed of the mixer 18 is so selected that the velocity of the upward flow in the periphery of the apparatus is sufficient to fluidize the balls 25. The heating steam is fed into the coil 19 via the branch 20. The condensate is continuously drained via the branch 21 of the coil 19. As the evaporation progresses, the secondary steam is continuously discharged via the branch 23 in the cover 16, and the starting solution is continuously fed in via the branch 22 in amounts sufficient to maintain its level in the apparatus at a constant height. As soon as a specified concentration is achieved, the concentrated solution is discharged via the branch 24.

Since the balls 25 in the apparatus are in a quasi-liquid state, they execute a vigorous random motion, exerting a continuous mechanical action on the outer surfaces of the coil 19 and the mixer 18 as well as on the inner surfaces of the housing 13 and the bottom 14, thereby preventing deposits from building up thereon. In addition, the balls 25 continuously destroy the laminar boundary layer on the surface of the coil 19, thereby boosting the transfer of heat from the heating steam to the solution being evaporated through the walls of the coil 19.

The apparatus shown in FIG. 2 may be equally successfully employed as a still for distillating liquid mixtures.

Figure 3:
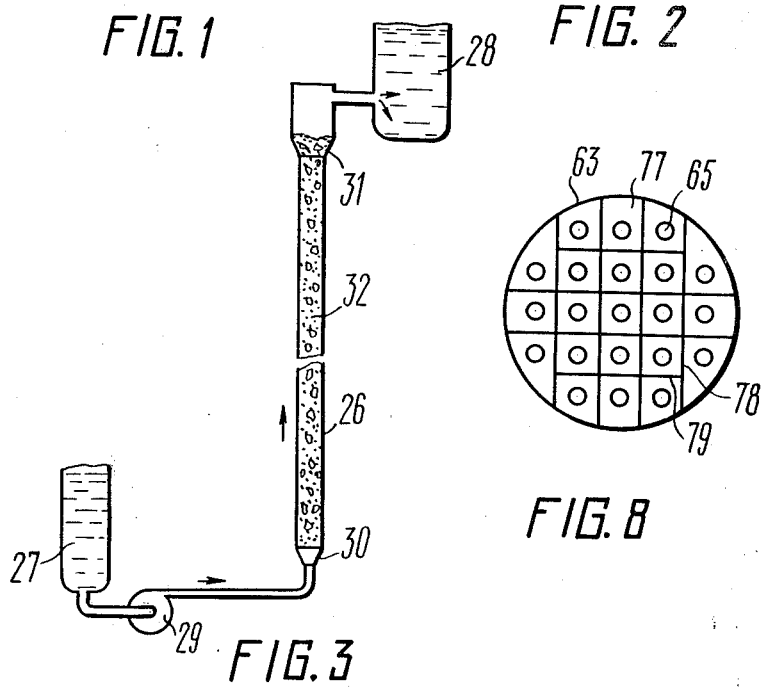
FIG. 3 is an axial elevation of the riser of a pipeline.

FIG. 3 shows the riser of a pipeline 26 designed for conveying liquids liable to leave deposits on the inner surface of the pipeline 26. As such deposits build up, the passage section of the pipeline decreases and its hydraulic resistance rises. The pipeline 26 is disposed intermediate a lower (as seen in the figure) vessel 27 and an upper vessel 28. Liquid is delivered into the pipeline 26 by a pump 29. At the inlet of the pipeline 26 there is mounted a diffuser 30 which adjoins the pipeline 26.

A diffuser 31 is mounted at the pipeline outlet.

The pipeline 26 is partially filled with balls 32 made of a material which is inert to the liquid being transported. The diameter of the balls 32 is selected depending on the minimum and maximum flow velocities over that portion of the pipeline 26 so that the balls 32 get fluidized at the minimum flow velocity, and the maximum flow velocity is somewhat lower than the ball-entraining velocity.

As liquid is being transported from the vessel 27 to the vessel 28 over the pipeline 26, the balls 32 are fluidized and driven into a vigorous random motion in the upward flow of liquid, thereby exerting a continuous mechanical action on the inner surface of the pipeline 26 and thus preventing deposition thereon.

FIG. 4 illustrates a vertical shell-and-tube heat exchanger which utilizes the method of the invention of preventing deposition on the surface of heat-transfer tubes.

The heat exchanger comprises a cylindrical housing 33 and a conical shell 34 which forms, in accordance with the invention, a widening portion of the housing 33 and which adjoins the upper (as seen in the figure) end of the housing 33 by way of the smaller base thereof. The upper (as seen in the figure) base of the shell 34 and the lower base of the housing 33 carry flanges 35 and 36, respectively, on which are mounted elliptical covers 37 and 38, respectively. Between each of the covers and the housing there is fitted a tube wall 39 (the upper one in the drawing) and a tube wall 40 (the lower one in the drawing).

The tube walls 39 and 40 have holes for receiving the ends of vertically mounted tubes 41, so that the tube walls 39 and 40 divide the inner space of the apparatus into a tubular space and an intertubular space. In the centre of the upper cover 37 there is provided a branch 42 for supplying a hot heat-transfer agent into the tubular space of the heat exchanger and in the centre of the lower cover 38 there is provided a branch 43 for discharging the cooled heat-transfer agent. In the lower (as seen in the figure) portion of the housing 33 there are formed holes with branches 44 for feeding cooling water into the intertubular space of the heat exchanger, whereas in the upper portion of the conical shell 34 there are provided holes with branches 45 for discharging cooling water. In the intertubular space of the apparatus somewhat above the branch connections 44 there is a distribution grid 46 mounted in the housing 33, with a bed of solid particles 47, e.g. quartz sand, disposed on the grid 46. The size of the particles 47 is selected depending on the minimum flow rate of cooling water so that at a velocity somewhat lower than the minimum cooling water flow velocity the particles 47 are fluidized. The intertubular space of the apparatus is charged with as many solid particles 47 as are needed to maintain the upper level of the bed of the fluidized particles 47 aligned with the junction of the housing 33 and the conical shell 34 at the nominal cooling water flow rate. Depending on the material from which the particles 47 are made, the angle between the generator of the conical shell 34 and the horizontal is so selected as to slightly exceed the angle of rest of the solid particles 47. The height of the conical shell 34 is so selected as to ensure that the velocity of the cooling water flow at the level of the cooling water discharge branches 45 is less than the velocity at which the solid particles 47 are carried away.

The apparatus operates in the following manner.

Cooling water is continuously supplied through the branches 44 and discharged from the intertubular space of the apparatus via the branches 45. Simultaneously, via the branch 42, the heat-transfer agent to be cooled is supplied into the apparatus, the heat-transfer agent being discharged from the apparatus via the branch 43. The cooling water flow fluidizes the solid particles 47 disposed on the grid 46. At the nominal flow velocity the fluidized bed of the solid particles 47 occupies the entire cylindrical portion of the housing 33. As the cooling water flow velocity rises due to the formation of deposits on the surface of the heat-transfer tubes 41 or for some other reason, the solid particles 47 start to be carried over into the conical shell 34 but fail to each the level of the branches 45, for the diameter of the shell 34 at this level is so selected that the water flow velocity does not exceed the entraining velocity of the particles 47. The fluidized solid particles 47 execute a vigorous random motion in the intertubular space and exert a continuous mechanical action on the outer surfaces of the tubes 41 as well as on the inner surfaces of the housing 33 and the shell 34, thereby preventing scale or muddy sediments from the cooling water from building up thereon. Also, with the laminar boundary film on the surfaces of the tubes 41 being continuously destroyed by the particles 47, the rate of heat exchange between the heattransfer agent flowing through the tubes 41 and the cooling water rises.

The apparatus shown in FIG. 4 may be equally successfully employed for cooling and heating gases, for condensing vapours, for implementing exo- or endothermic chemical reactions, or for evaporating liquids.

In those cases where cooling water is not recycled and is freely drained from the heat exchanger into an open reservoir, or where the cooling water circulation system is a two-step one, it is recommended to employ a heat exchanger of the type shown in FIG. 5. It comprises a cylindrical housing 48, with a conical shell 49 adjoining the upper (as seen in the figure) end of the housing 48 by way of the smaller base thereof. The larger base of the conical shell 49 remains free and serves as a free overflow lip for cooling water. Adjoining the lower (as seen in the figure) end of the housing 48 is a flange 50 for mounting a cover 51 having a centre hole with a branch 52 for discharging the heat-transfer agent. Between the cover 51 and the flange 50 there is installed a tube wall 53 with holes wherein are rigidly fixed heat-transfer tubes 54 vertically mounted in the housing 48. The upper ends of the tubes are fixed in a tube wall 55. The length of the tubes 54 is so selected that between the tube wall 55 and the end face of the shell 49 there is defined a clearance sufficient to ensure free passage for cooling water. Fitted on the tube wall 55 is a cover 56 having a centre hole with a branch 57 for feeding the hot heat-transfer agent.

There are holes with branches 58 for feeding cooling water provided in the lower portion of the housing 48. An annular vessel 59 for collecting cooling water is attached to the housing 48 somewhat below the junction of the shell 49 and the housing 48. On the lateral surface of the vessel 59 there are formed holes with branches 60 for draining discharge cooling water from the vessel 59.

A grid 61 carrying a bed of solid particles 62, e.g. quartz sand, is fitted in the housing 48 somewhat above the level of the branches 58. The height of the bed of the solid particles 62 and the size of the particles 62 as well as the conicity angle and the height of the shell 49 are all selected to meet the conditions specified hereabove for the heat exchanger shown in FIG. 4.

The apparatus operates in the following manner.

Cooling water is fed through the branches 58, while a hot heat-transfer agent is delivered through the branch 57. The cooling water washes the tubes and then overflows over the edge of the shell 49 into the vessel 59 wherefrom it is drained through the branches 60. The cooled heat-transfer agent is drained through the branch 52. On its way through the heat exchanger the cooling water passes through the grid 61 and fluidizes the solid particles 62 disposed thereon. At the nominal speed of the cooling water, the fluidized bed of the solid particles 62 occupies the entire cylindrical portion of the housing 48. Should the water flow velocity in the intertubular space increase, some of the solid particles 62 are carried over into the conical shell 49 but fail to rach the level of the larger base thereof for at this level the flow velocity is less than the entraining velocity of the solid particles 62, which is achieved by selecting an appropriate conicity angle and height of the shell 49. Thus, cooling water arrives at the vessel 59 without solid particles 62. Being in a fluidized state, the solid particles 62 execute a vigorous random motion and exert a continuous mechanical action on the outer surface of the tubes 54 as well as on the inner surfaces of the housing 48, thereby preventing deposits from cooling water from building up thereon. Further, with the solid particles 62 continuously destroying the laminar boundary film on the surfaces of the heat-transfer tubes 54, the rate of heat exchange between the cooling water and the heat-transfer agent rises.

The apparatus depicted in FIG. 5 may be equally successfully employed for cooling and heating gases, for condensing vapours and evaporating liquids, as well as for implementing exo- or endothermic chemical reactions.

FIG. 6 illustrates a vertical shell-and-tube heat exchanger which utilizes the inventive method. The apparatus is designed for vapour condensation. The heat exchanger comprises a cylindrical housing 63 the ends of which carry fixed tube walls 64 serving to receive the ends of heat-transfer tubes 65 vertically mounted in the housing 63. An upper (as seen in the figure) cover 68 and a lower cover 69 are attached to each of the tube walls 64 by means of flanges 66 and 67, respectively. The tube walls 64 separate the tubular space of the apparatus from the intertubular space thereof. In the upper (as seen in the figure) portion of the housing 63 there is provided a vapour inlet branch 70, while in the lower portion of the housing 63 there is provided a condensate discharge branch 71. The lower cover 69 has a centre hole with a branch 72 for feeding cooling water, while the upper cover 68 has a centre hole with a branch 73 for draining cooling water. A nozzle 74 is mounted in each heat-transfer tube 65 at the cooling water inlet thereof, the nozzles 74 serving to uniformly distribute cooling water among the tubes 65.

Each of the tubes 65 is partially filled with porcelain balls 75 employed as solid particles for preventing deposits from the cooling water from building up on the inner surfaces of the tubes 65. The diameter of the balls 75 is selected depending on the cooling water flow velocity so that the velocity at which the fluidization process gets under way is somewhat lower than the minimum water flow velocity in the tubes 65. The tubes 65 are charged with as many balls 75 as are needed to ensure that at the cooling water flow velocity in the tubes 65 corresponding to its nominal flow rate the fluidized bed completely fills the tubes 65.

Each of the tubes 65 has a widening portion at the cooling water outlet thereof so as to prevent the balls 75 from escaping therefrom.

In the current example, each widening section is a diffuser 76 adjoining the respective tube 65 by way of the smaller base thereof. The conicity angle of the diffuser 76 is selected to be somewhat less than the angle of rest of the balls 75.

The height of the diffuser 76 is so selected that the maximum permissible flow velocity at the level of the upper base of the diffuser 76 is below the entraining velocity of the balls 75.

The apparatus operates in the following manner.

The vapour to be condensed is supplied through the branch 70. The vapour passes through the intertubular space of the apparatus in a downward direction, washing the tubes 65. Simultaneously, cooling water is fed into the tubular space of the apparatus through the branch 72, the cooling water moving in an upward direction through the tubular space. The condensed vapour is discharged via the branch 71, while the heated cooling water is drained via the branch 73. On its way through the nozzles 74 and farther on through the tubes 65 of the apparatus the cooling water fluidizes the balls 75 in each of the tubes 65. At the rated cooling water flow velocity in the tubes 65, the fluidized bed of the balls 75 rises in the tubes 65 to reach the level of the junction of each of them with the diffuser 76. Should the cooling water flow velocity increase due to a rise in the overall water flow rate in the heat exchanger or to a non-uniform pattern of water distribution among the tubes 65, some balls 75 escape from one or more tubes 65 and into the diffuser 76. But since the water flow velocity at the level of the larger base of the diffuser 76 does not exceed the entraining velocity of the balls 75, the latter cannot escape from the diffuser 76; and as the cooling water velocity is brought back to the rated value, the balls 75 return to the respective tubes 65. The fluidized balls 75 execute a random motion and exert a continuous mechanical action on the inner surfaces of the tubes 65, thereby preventing deposits from the cooling water from building up thereon.

The apparatus shown in FIG. 6 may likewise be employed for heating and cooling liquids, for vaporizing liquids and for implementing exo- or endothermic chemical reactions. In this case the material from which the solid particles are made is selected to be inert towards the liquefying medium.

In those cases where the heat exchanger comprises a relatively large number of tubes 65 per unit area of the tube wall 64 and the tubes 65 are disposed so close one to another that it is impossible to mount the diffuser 76 on each one of them, it is recommended to employ the heat exchanger shown in FIG. 7. It is basically similar to the heat exchanger shown in FIG. 6 except that the widening portion of each of the tubes 65 is formed as a section 77 defined by partitions 78 and 79 (FIG. 8) which are in parallel relationship with the tubes 65 and which separate the outlets of the tubes 65 one from another. The partitions 78 and 79 adjoin, by way of one edge, the upper (as seen in the figure) tube wall 64 (FIG. 7). The height of the partitions 78 and 79 is so selected that the straight line connecting the upper (as seen in the figure) point of the vertical line of intersection of the partitions 78 and 79 making up the section 77 and the nearest point on the upper end face of the tube 65 forms an angle with the vertical somewhat smaller than the angle of rest of the balls 75 or other solid particles employed in the apparatus.

The layout of the partitions 78 and 79 is shown in FIG. 8; it is selected depending on the arrangement and number of the tubes 65 fixed in the tube wall 64.

The latter heat exchanger operates in a manner exactly similar to the one shown in FIG. 6.

What we claim is:

1. A shell-and-tube apparatus for carrying a flowing liquid medium containing solid particles which exert mechanical action on the inner surfaces of the apparatus to prevent deposition thereon, which comprises: a hollow housing with a cover at each end; tube walls mounted in said housing; tubes vertically mounted in, and uniformly spaced throughout, said housing and having the ends thereof fixed in said tube walls, each of said tubes being partially filled with solid particles; said tube walls dividing the inner space of said housing with said covers into a tubular space and an intertubular space; connecting branches adjoining the covers of said housing and serving for feeding and discharging a cooling liquid medium into and out of the tubular space of the apparatus; connecting branches adjoining said housing and serving for feeding and discharging a specific medium to be cooled into and out of the intertubular space of the apparatus; means installed in each of said tubes at the medium flow inlet thereof for regulating the medium flow velocity at a uniform rate below that which would entrain said solid particles, thus serving to prevent said solid particles from escaping from said tube; each of said tubes having a widening portion at the medium flow outlet thereof, which widening portion serves to prevent said solid particles from being carried away therefrom by the medium flow which fluidizes said solid particles.

2. A shell-and-tube apparatus as claimed in claim 1, wherein each of the widening portions is formed as a diffuser.

3. A shell-and-tube apparatus as claimed in claim 1, wherein the widening portion of each tube is formed as a section defined by vertical partitions adjoining, by way of one edge, the tube wall and separating the outlets of the tubes one from another.

4. A vertical shell-and-tube heat-exchanger for carrying a flowing cooling liquid medium containing solid particles which exert mechanical action on the inner surfaces of the exchanger and thereby prevent deposition thereon, comprising:

(a) a hollow, cylindrical housing;
(b) an upper cover at the upper end of the housing and a lower cover at the lower end of the housing;
(c) an upper tube wall at the upper end of the housing and horizontally mounted between the upper cover and the upper end of the housing, and a lower tube wall at the lower end of the housing and horizontally mounted between the lower cover and the lower end of the housing;
(d) a plurality of heat-transfer tubes vertically positioned in, and uniformly spaced throughout, said housing and mounted therein with the tube ends fixed in said tube walls, the upper ends of said tubes being flared to form a widened section serving as a diffuser and extending beyond the upper end of the housing into the hollow cavity of the upper cover and serving as the outlet ends of the tubes; said tubes and tube walls serving to divide the inner space of the housing and covers into a tubular space and an intertubular space;
(e) a lower inlet in the lower cover for feeding a cooling liquid medium into the tubular space of the housing, and an upper outlet in the upper cover for discharging the cooling liquid medium from the tubular space on the housing;
(f) upper inlet means at the upper end of the housing near and below the upper tube wall for feeding a heat-transfer agent to be cooled into said intertubular space of the housing, and lower outlet means at the lower end of the housing near and above the lower tube wall for discharging the cooled heat-transfer agent from said intertubular space in the housing;

(g) means in the lower ends of said tubes for supporting a bed of solid particles carried by said tubes and means for uniformly distributing the cooling liquid medium flow, at a uniform velocity below that which would entrain said solid particles, to fluidize said solid particles which, in turn, are prevented from being carried away from the tubular space by the widening effect of the flared upper ends of the tubes.

5. The heat exchanger of claim 4 wherein the flared portion of each tube is formed as a section defined by vertical partitions separating the tube outlets from each other and adjoining each other through a common edge of the upper tube wall.

* * * * *